C. W. & W. C. COLLYER.
Sole-Molding Machine.

No. 211,621. Patented Jan. 28, 1879.

Witnesses.
N. E. Whitney.
L. F. Connor.

Inventor.
Charles W. Collyer and Wm. C. Collyer,
by Crosby & Gregory, Attys.

C. W. & W. C. COLLYER.
Sole-Molding Machine.
No. 211,621. Patented Jan. 28, 1879.
3 Sheets—Sheet 2.
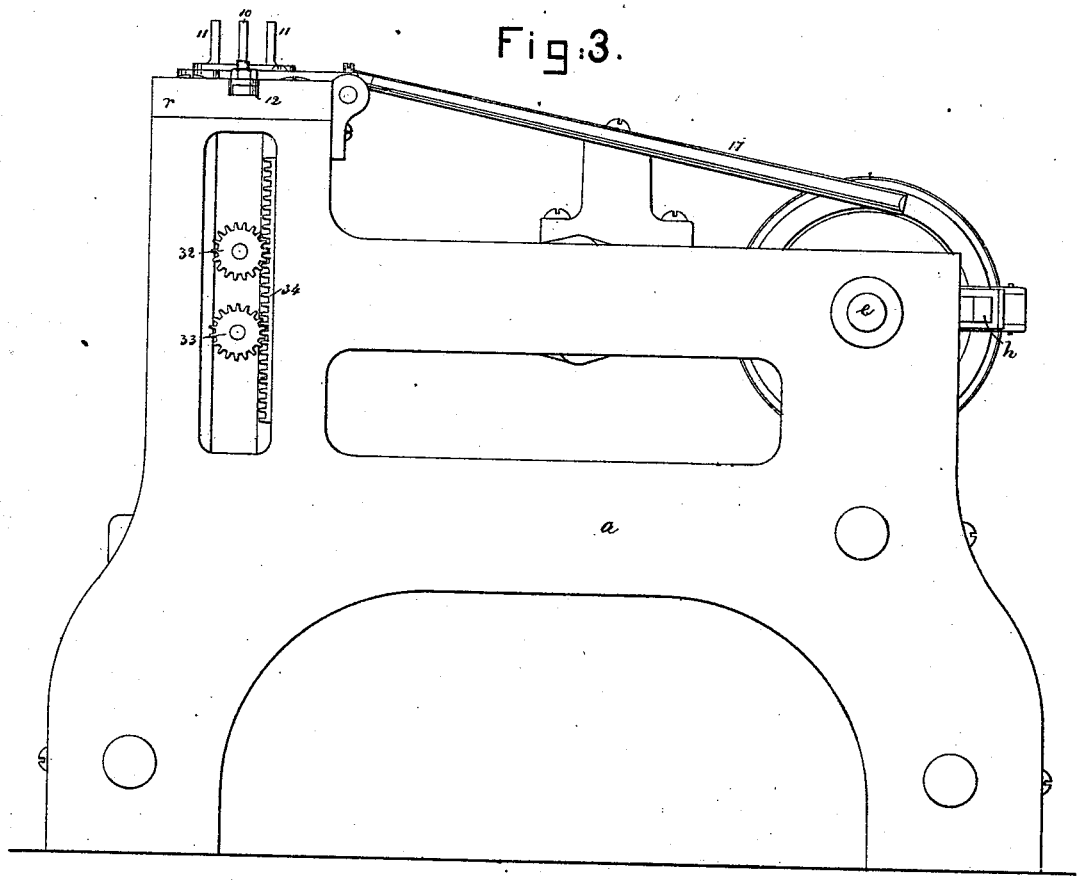
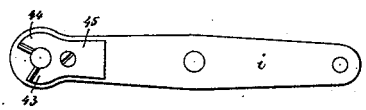
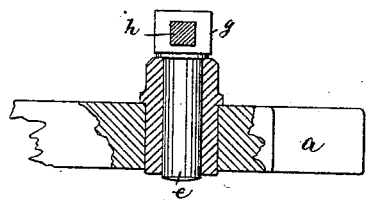
Witnesses.
N. E. Whitney.
L. F. Connor.
Inventor.
Charles W. Collyer and Wm. C. Collyer.
by Crosby & Gregory, Atty's C. W. & W. C. COLLYER.
Sole-Molding Machine.
No. 211,621. Patented Jan. 28, 1879.
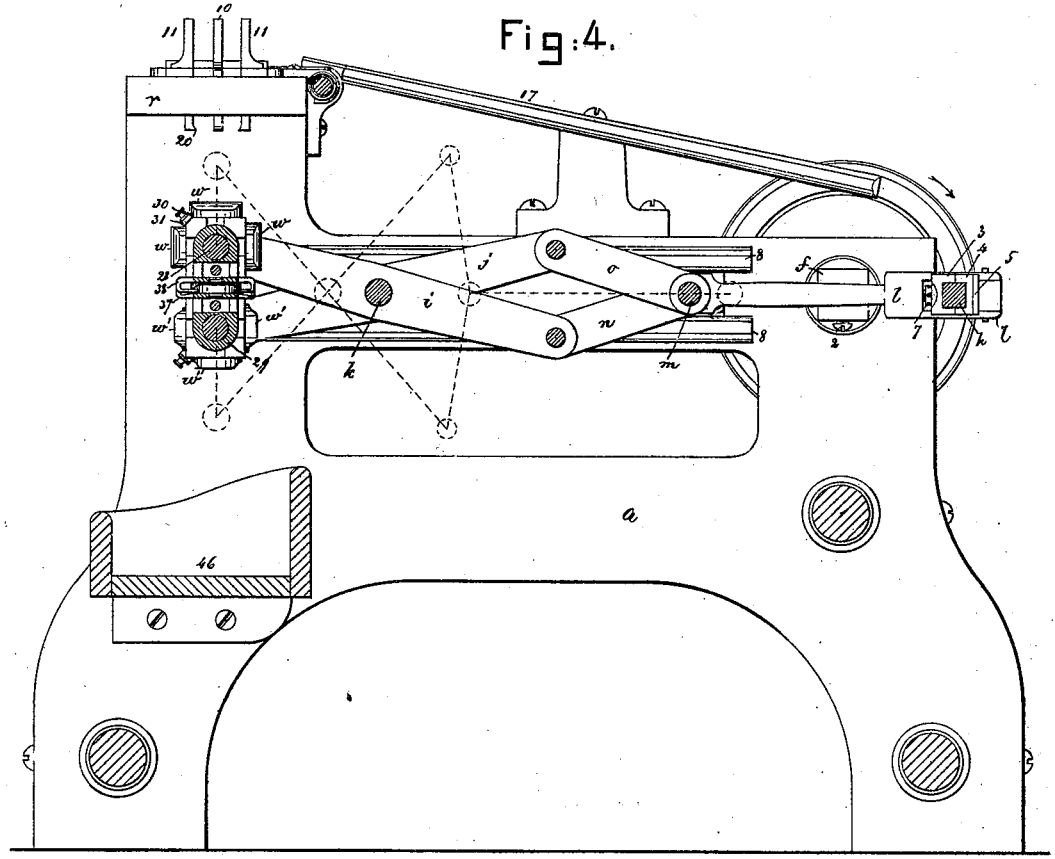
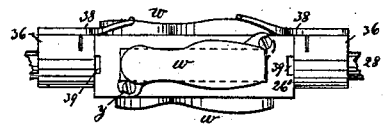
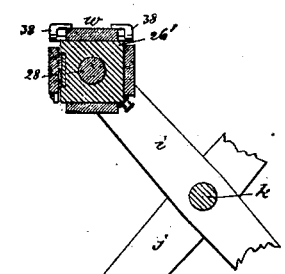
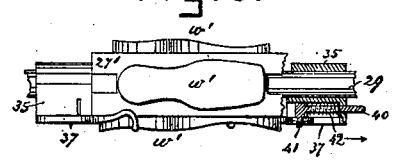
Witnesses.
N. E. Whitney
L. F. Connor.
Inventor.
Charles W. Collyer and Wm. C. Collyer.
by Crosby & Gregory, Attys

UNITED STATES PATENT OFFICE.

CHARLES W. COLLYER AND WILLIAM C. COLLYER, OF LYNN, MASS.

IMPROVEMENT IN SOLE-MOLDING MACHINES.

Specification forming part of Letters Patent No. 211,621, dated January 28, 1879; application filed November 29, 1878.

*To all whom it may concern:*

Be it known that we, CHARLES W. COLLYER and WILLIAM C. COLLYER, of Lynn, county of Essex, State of Massachusetts, have invented an Improvement in Sole-Molding Machines, of which the following is a specification:

This invention relates to sole-molding machines, and has for its object the production of a machine by which soles may be automatically presented to a pair of molds, be pressed and molded, and then be discharged therefrom.

Figure 1:
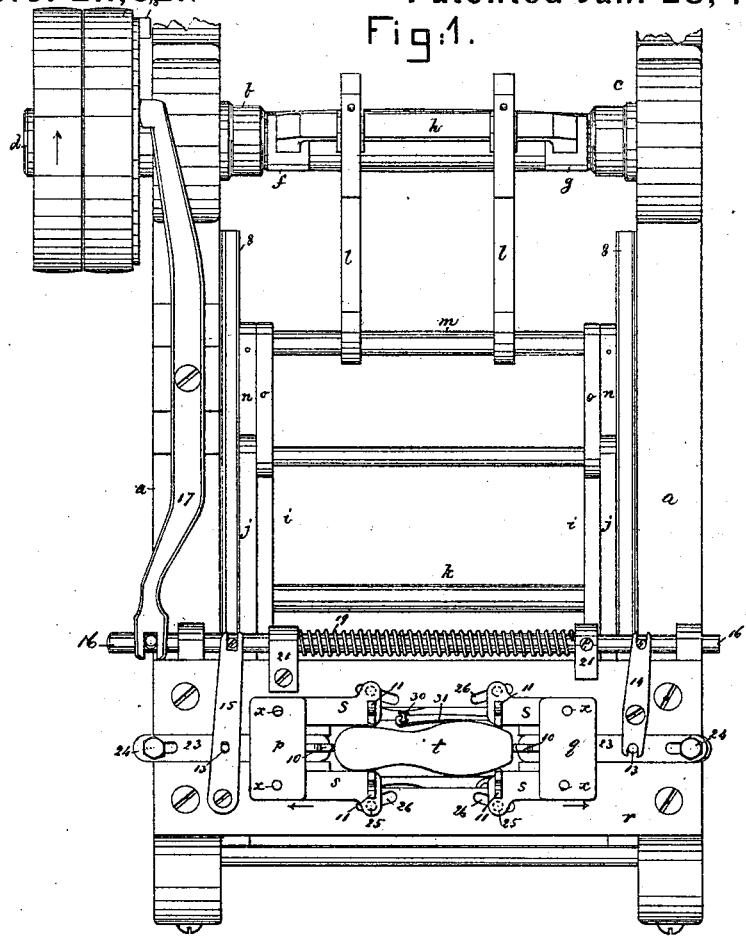
Figure 2:
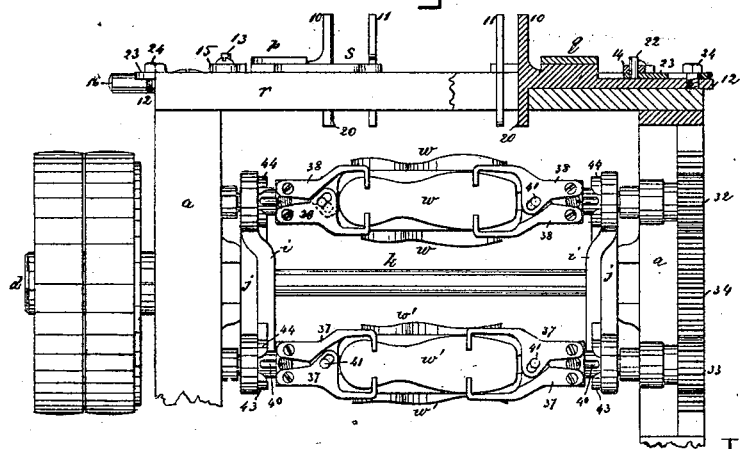

Figure 1 represents, in top view, a sole-molding machine embodying our invention. Fig. 2, a front end view thereof; Fig. 3, a side elevation, the molds being closed upon and so as to press a sole; Fig. 4, a longitudinal section of Fig. 3; Figs. 5 and 6, different faces of the mold; Fig. 7, a detail in cross-section of the molds, they being separated; Fig. 8, a detail of one of the mold-carrying toggle-levers, and Fig. 9 a detail of the bearing and main shaft.

The frame $a$, of suitable shape to sustain the working parts, has bearings $b$ $c$ to receive short shafts $d$ $e$, provided with heads $f$ $g$, having openings to receive the ends of a bent shaft, $h$, the latter being adjustably held in the heads by set-screws, thereby making a cranked shaft having an adjustable throw to impart to the crossed levers $i$ $j$, pivoted at $k$, more or less motion, to press the molds attached to the forward ends of such levers together with more or less force, according to the thickness and character of the leather composing the sole. This shaft is shown as provided with a fast and loose pulley to receive a belt, by means of which it may be rotated.

The links $l$, slotted at their rear ends, embrace two-part boxes, 3 4, fitted to the shaft $h$. (See. Fig. 4.) Between the portions 4 of these boxes and the end of the arm are india-rubber springs 5, which, as the toggle-levers $i$ $j$ are brought into the position shown in Fig. 4, permit the molds at the ends of the levers to yield to any unusually thick or hard places of the sole to prevent breaking the machine, and the screws 7, which bear upon the parts 3 of the boxes, compensate for wear of the shaft.

The forward ends of the links connect with the rod $m$, having heads at its ends which fit into guideways formed between ledges 8 8. Arms $n$ $o$ connect the shaft $m$ and levers $i$ $j$, and as the shaft $m$ is moved horizontally in the guideways the arms $n$ $o$, acting upon the levers, force them together, as shown in Fig. 4, to press a sole, and then separate them, as shown in Fig. 7, to receive and discharge a sole.

The soles $t$ to be pressed are died out and placed in stack between the guides 10 11 of the heads $p$ $q$ of the sole-feeding devices, guides 10 acting upon the ends, and guides 11 upon the sides, of the soles, while projections 20 at the lower ends of the guides sustain the stack of soles until the holders are moved in the direction of the arrow, when the lowermost sole of the stack is discharged. These holders have tail-pieces 12, Fig. 3, fitted to slide in or upon the portion $r$ of the frame, and are moved longitudinally in the direction of the arrows by means of a lever, 17, acted upon by a projection, 18, on the fast pulley, (see Fig. 1,) said lever being connected at its forward end with a rod, 16, held in bearings 21, and provided with pins which enter openings in pivoted levers 14 15, connected with pins 13 on bars 23, adjustably attached by screws 24 with the tail-pieces 12, the adjustment of the bars upon the tail-pieces adapting the holders to soles of different lengths.

The opposite motion of the holders is produced by the spring 19 on the rod 16.

The guides 11, for the sides of the soles, are attached to arms $s$, pivoted to the heads of the holders at $x$, (see Fig. 1,) and said arms have pins 25, which enter diagonal slots 26 in the portion $r$, so that as the holders are drawn away from the ends of the soles the side guides will be carried away from the sides of the soles far enough to permit the removal of the lowermost sole of the stack, and when moved toward each other to again grasp the soles at their ends and sides.

The molds $w$ $w'$, the former to operate upon the inner, and the latter upon the outer, surfaces of the soles to be molded, are in this instance of our invention shown as compounded or made of different sizes and attached to sleeves 26' 27' on rods 28 29, carried at the ends of the toggle-levers *i j*. These sleeves are each shown as having attached to them, preferably by screws, as shown at *y*, Fig. 5, metallic molds of suitable shape and size to simultaneously mold the two faces of the sole, as may be desired, and the sleeves, when adjusted so that molds of like size will meet face to face, are securely fastened to the shafts 28 29 by suitable fastening devices, herein shown as pins 30 at the ends of springs 31, the pins entering grooves in the shafts. These shafts 28 29, held loosely at the ends of levers *i j*, have secured to them at each end pinions 32 33, which engage the teeth of a stationary rack, 34, and as the levers are moved from the position shown in Fig. 7 (where the mold *w*, then uppermost, receives from the stack a sole to be molded, and its fellow *w'*, then lowermost, discharges a sole already molded,) to the position shown in Fig. 4, where the molds *w w'* are supposed to be pressing the sole firmly between them, these shafts and molds are each rotated one-half around in opposite directions, so the molds, which are face to face to press the sole at its opposite sides when the levers are as in Fig. 1, are, when in the position shown in Fig. 7, the one *w* at the extreme upper, and the one *w'* at the extreme lower, side of the sleeves.

To automatically place the sole to be molded upon the mold *w*, and hold it thereon while such mold turns to a position directly facing the mold *w'*, of corresponding size, but of converse shape, we have applied loosely to the shafts 28 29, and at each end of the mold holders or sleeves, finger-carriers 35 36, provided with pairs of fingers 37 38, each pivoted at the end to its proper sleeve, and provided at its outer end with a prong, so that as said fingers are vibrated about their pivotal points the prongs may be made to move outward away from the mold when the latter is in its highest position to receive, and in its lowest position so as to discharge, a sole, while at all other times the prongs are made to overlap the sole, being pressed or molded, as shown in Fig. 2, wherein it is supposed that the mold *w* has a sole upon it, and that the molds *w w'* are moved toward each other to press that sole. These finger-carriers are caused to rotate with the shaft and sleeves, or mold-holders, by means of projections 39 on the carriers, which enter notches in the holders, or vice versa, (see Fig. 5,) and the fingers are opened and closed at the proper times by means of bolts 40, provided with heads 41, which enter diagonal slots in the fingers. (See Figs. 2 and 6.) These bolts 40 are moved in the direction of the arrow, Fig. 6, to close the fingers by means of springs 42 upon their shanks, and the fingers are opened to receive the sole below their prongs, or to discharge the sole from under their prongs, by means of cams 43 44 on cam-plates 45, attached by screws or otherwise to, or made as part of, levers *i j*. (See Figs. 2 and 8.) The molded soles, discharged as described, will fall into a suitable receiver or sole-box, 46.

The sleeves or the levers *i j* may carry one or any desired number of pairs of molds, of any usual size or shape.

The soles to be pressed might be placed upon the first mold, *w*, by hand instead of automatically; but such plan is not preferred.

The upper mold, *w*, might be made to semi-rotate, as described, and the lower mold might be held stationary, or be moved less than a semi-rotation, and the pressed sole be discharged by hand, or by other mechanism than that shown.

We claim—

1. In a sole-molding machine, a sole-mold to receive a sole, hold, and partially rotate with it, combined with a second mold opposite thereto, upon which the sole is placed by the first mold, and with mechanism to force the two molds together upon the sole, substantially as described.

2. Sole-feeding mechanism to feed a sole to one member of a mold, combined with a mold and fingers to confine to the mold a sole to be molded, substantially as described.

3. In a sole-molding machine, the combination, with the second member of the mold, of a set of fingers operating therewith to hold the sole already molded, and mechanism to operate said fingers to discharge the molded sole, substantially as described.

4. The combination, with one member composing the mold, substantially as described, of fingers to hold the sole and mechanism to rotate the mold, substantially as and for the purposes set forth.

5. The crank-shaft composed of the short shafts *d e*, the heads, and the adjustable portion *h*, combined with the links *l*, rod *m*, links *n o*, and levers *i j* to operate the molds, substantially as described.

6. In a sole-molding machine, the combination, with the crank-shaft, links *l*, and boxes 3 4, of the elastic packing interposed between boxes 3 and the links, to operate substantially as described.

7. The heads *p q* of the sole-feeding devices, combined with guides 10 11, to operate upon the soles substantially as described.

8. The guides of the sole-feeding mechanism, provided with projections 20 to support the lowermost sole of a pile of soles, combined with mechanism to move the guides from and toward the soles to release the soles intermittingly, substantially as described, to be delivered to the mold.

9. The combination, with the head *q*, its portion 12, and a lever to move the head, of the adjustable bar 23, whereby the extent of reciprocation of the head may be regulated without change of length of the lever, substantially as described.

10. The rod 16, heads *p q*, arms *s*, and guides 10 11, combined with the levers 14 15, connected with the heads, one lever being connected with one head at its end, while the other lever is connected at or near its middle with the head, to move the heads simultaneously in opposite direction by the reciprocation of the rod 16, substantially as described.

11. The shaft 28 and sleeve and attached mold, combined with finger-carriers and fingers, and mechanism to automatically open and close the fingers to hold and release a sole, substantially as described.

In testimony whereof we have signed our names to this specification in the presence of two subscribing witnesses.

CHARLES W. COLLYER.
WILLIAM C. COLLYER.

Witnesses:
G. W. GREGORY,
N. E. WHITNEY.